United States Patent [19]

Toner et al.

[11] Patent Number: 4,878,169
[45] Date of Patent: Oct. 31, 1989

[54] REGION OF INTEREST TOMOGRAPHY EMPLOYING A DIFFERENTIAL SCANNING TECHNIQUE

[75] Inventors: Paul D. Tonner; Terence Taylor, Both of Deep River, Canada

[73] Assignee: Atomic Energy of Canada Limited-Energie Atomique Du Canada Limitee, Ottawa, Canada

[21] Appl. No.: 213,131

[22] Filed: Jun. 29, 1988

[30] Foreign Application Priority Data

Sep. 11, 1987 [CA] Canada ..................... 546640

[51] Int. Cl.$^4$ ..................... G06F 15/42; G05B 6/03; G01R 23/04
[52] U.S. Cl. ..................... 364/413.19
[58] Field of Search ..................... 364/413.19, 413.14, 364/413.15

[56] References Cited

U.S. PATENT DOCUMENTS

| | | | |
|---|---|---|---|
| 4,129,775 | 12/1978 | O'Meara ..................... | 250/203 R |
| 4,228,505 | 10/1980 | Wagner ..................... | 364/413.16 |
| 4,305,127 | 12/1981 | Heuscher ..................... | 364/413.18 |
| 4,333,145 | 6/1982 | Heuscher et al. ..................... | 364/413.16 |
| 4,394,738 | 7/1983 | Wagner ..................... | 364/413.15 |
| 4,550,371 | 10/1985 | Glover et al. ..................... | 364/413.18 |

OTHER PUBLICATIONS

Ogawa, K. et al., "A Reconstruction Algorithm from Truncated Projections", IEEE Transactions on Medical Imaging, vol. MI-3, No. 1, Mar. 1984, 34-40.
Nalcioglu, O., "Limited Field of View Reconstruction in Computerized Tomography", IEEE Transactions on Nuclear Science, vol. NS-26, No. 1, Feb. 1979, 546-551.
O. Nalcioglu, P. W. Sankar, J. Slansky, "Region-of-Interest X-Ray Tomography (ROIT)", Journal of the Society of Photo-Interpretive Engineers (SPIE), vol. 206: Recent and Future Developments in Medical Imaging II (1979), pp. 98-102.
S. C. Huang, M. E. Phelps & E. J. Hoffman, "Effect of Out-of-Field Objects in Transaxial Reconstruction Tomography", Reconstruction Tomography in Diagnostic Radiology and Nuclear Medicine, M. M. Ter-Pogossian et al., Eds. University Park Press, Baltimore, (1977) pp. 185-198.
B. E. Oppenheim, "More Accurate Algorithms for Iterative 3-Dimensional Reconstruction", IEEE Transactions on Nuclear Science, NS-21 (1974) 72.
W. Wagner, "Reconstructions from Restricted Region Scan Data-New Means to Reduce the Patient Dose", IEEE Transactions on Nuclear Science, NS-26 (1979) 2066.
B. E. Oppenheim, "Three-Dimensional Reconstruction From Incomplete Projections", The University of Chicago, Chicago, Ill., U.S.A. WA1-1 to WA1-4.
W. B. Gilboy, "X- And $\gamma$-Ray Tomography in NDE Applications", Nuclear Instruments and Methods in Physics Research, 221 (1984) 193-200.

(List continued on next page.)

Primary Examiner—Clark A. Jablon
Attorney, Agent, or Firm—Vorys, Sater, Seymour and Pease

[57] ABSTRACT

A method of generating a computed tomographic image of a region-of-interest of a sample is described in which only the region-of-interest need be scanned, i.e. it is not necessary to scan the entire sample. Reference data for the region-of-interest of a complete reference object that is a relatively good match to the sample outside the region-of-interest and has a known attenuation distribution inside the region-of-interest is first obtained. This can be done by scanning only the region-of-interest of an actual complete reference object or by constructing a digital image of the reference object and mathematically scanning only the region-of-interest of the image. Then the region-of-interest of the sample is scanned to obtain sample data from which the reference data is subtracted. A differential image is reconstructed from the differential data thus obtained. The method allows the use of equipment which is simpler, more compact and less costly than conventional CT equipment.

12 Claims, 15 Drawing Sheets

OTHER PUBLICATIONS

R. M. Polichar & D. C. Shreve, "X-Ray Computed Tomography of Thick Steel Castings and Forgings" American Society For Metals, Metals Park, Ohio, 5th Int. Conf. On NDE in the Nuc. Ind., San Diego, May 1982.

R. H. T. Bates, et al., "Image Processing for 2-D and 3-D Reconstruction From Projections: Theory and Practice in Medicine and the Physical Sciences" Topical Meeting on Image Processing for 2-D and 3-D Reconstruction from Projections, Aug. 4–7, 1975, Stanford University.

R. N. Bracewell & S. J. Wernecke, "Image Reconstruction Over a Finite Field of View", Journal of the Optical Society of America, vol. 65, Nov. 1975; pp. 1342 to 1346.

P. Reimers, W. B. Gilboy and J. Goebbels, "Recent Developments in the Industrial Application of Computerized Tomography with Ionizing Radiation", NDT International, 17 (1984) 197.

D. A. Chesler, S. J. Reiderer and N. J. Pelc, "Noise due to Photon Counting Statistics in Computed X-Ray Tomography", Journal of Computer Assisted Tomography, 1 (1977) 64.

T. Taylor, N. A. Keller, P. W. Reynolds and S. Shinmoto, "A Computed Tomography System for Studies of Two-Phase Flow", Atomic Energy of Canada Limited Proprietary Report, CRNL-2976, 1986.

P. D. Tonner, G. Tosello, "Computed Tomography Scanning for Location and Sizing of Cavities in Valve Castings", Materials Evaluation, 44 (1986) 203.

I. Morgan and Sulaksh Gautam, "Final Report on the Application of Computerized Tomography for Nondestructive Evaluation of Weldments", Scientific Measurement Systems, Inc. Feb. 18, 1983.

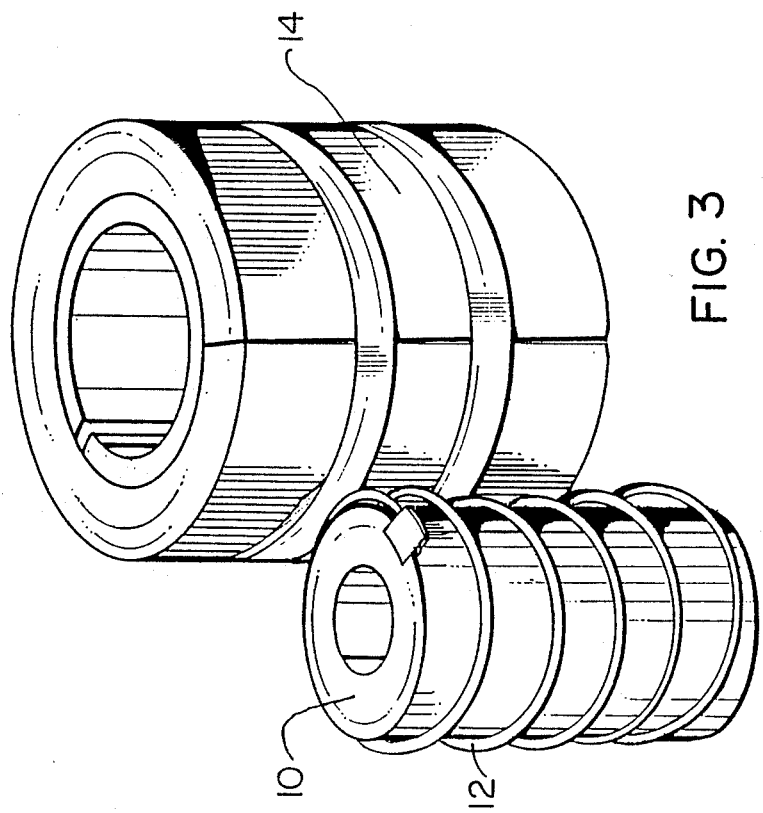

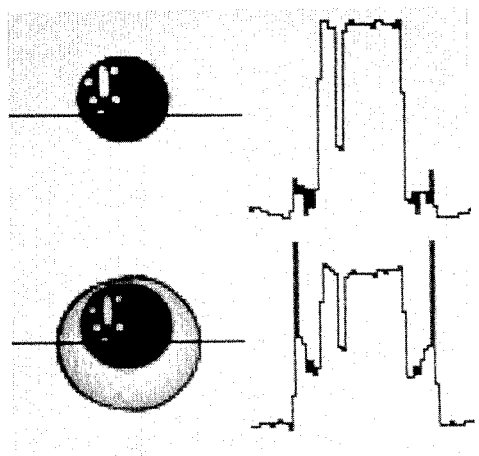 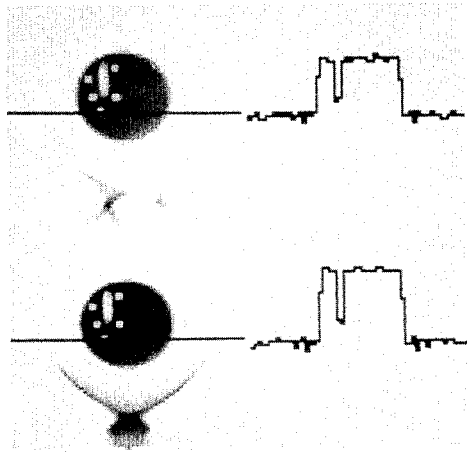
FIG. 6A  FIG. 6B
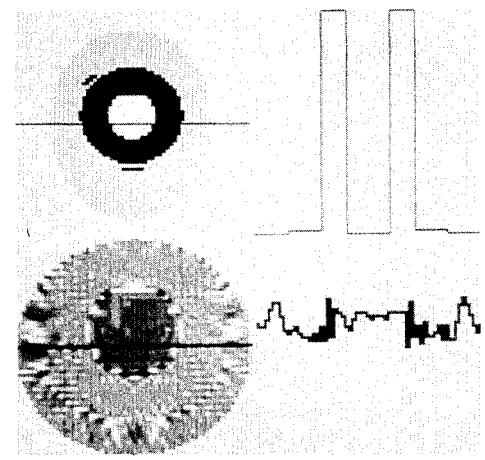 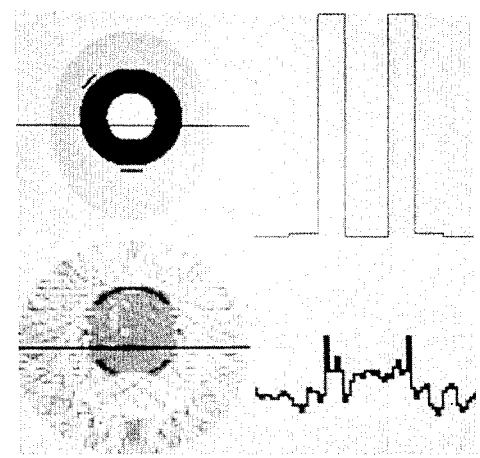
FIG. 6C  FIG. 6D

TYPICAL
REGION OF
INTEREST (ROI)
OUTLINE
33

REGION OF INTEREST TOMOGRAPHY EMPLOYING A DIFFERENTIAL SCANNING TECHNIQUE

BACKGROUND OF THE INVENTION

This invention relates to computed tomography (CT) imaging.

CT imaging is now a standard procedure in medical diagnosis and non-medical applications are being reported with increasing frequency (1), see, for example, Reference No. (1) of the following list; of references:

(1) P. Reimers, W. B. Gilboy and J. Goebbels, "Recent Developments in the Industrial Application of Computerized Tomography with Ionizing Radiation", NDT International, 17 (1984) 197.

(2) L. M. Zatz, "Basic Principles of Computed Tomography Scanning", Radiology of the Skull and Brain, Vol. V: Technical Aspects of Computed Tomography, T. H. Newton and D. G. Potts, Eds. (The C. V. Mosby Company, St. Louis, 1981), pp 3853-3876.

(3) O. Nalcioglu, P. V. Sankar, J. Slansky, "Region-of-Interest X-Ray Tomography (ROIT)", Journal of the Society of Photo-Interpretive Engineers (SPIE), Vol. 206: Recent and Future Developments in Medical Imaging II (1979) pp 98-102.

(4) S. C. Huang, M. E. Phelps and E. J. Hoffman, "Effect of Out-of-Field Objects in Transaxial Reconstruction Tomography", Reconstruction Tomography in Diagnostic Radiology and Nuclear Medicine, M. M. Ter-Pogossian et al., Eds. University Park Press, Baltimore, (1977) pp 185-198.

(5) O. Nalcioglu, Z. H. Cho and R. Y. Low, "Limited Field of View Reconstruction in Computerized Tomography", IEEE Transactions on Nuclear Science, NS-26 (1979) 546.

(6) B. E. Oppeheim, "More Accurate Algorithms for Iterative 3-Dimensional Reconstruction", IEEE Transactions on Nuclear Science, NS-21 (1974) 72.

(7) W. Wagner, "Reconstructions From Restricted Region Scan Data-New Means to Reduce the Patient Dose", IEEE Transactions on Nuclear Science, NS-26 (1979) 2066.

(8) A. Rosenfeld and A. C. Kak, Digital Image Processing, Academic Press, Toronto, 1982.

(9) P. M. Joseph, "Artifacts in Computed Tomography", Ref. 2, Ch. 114, pp 3956-3992.

(10) D. A. Chesler, S. J. Reiderer and N. J. Pelc, "Noise Due to Photon Counting Statistics in Computed X-Ray Tomography", "Journal of Computer Assisted Tomography," 1 (1977) 64.

(11) T. Taylor, N. A. Keller, P. W. Reynolds and S. Shinmoto, "A Computed Tomography System for Studies of Two-Phase Flow", Atomic Energy of Canada Limited proprietary report, CRNL-2976, 1986.

(12) P. D. Tonner, G. Tosello, "Computed Tomography Scanning for Location and Sizing of Cavities in Valve Castings", Materials Evaluation, 44 (1986) 203.

CT is a non-invasive technique that can provide an acurate quantitative mapping of the distribution of linear attenuation coefficients inside a body of arbitrary shape and composition.

Referring firstly to FIG. 1 which is a conventional transverse and angular scanning pattern used in CT, the data for a CT image are planar and consist of transverse scans or projections of photon attenuation as a function of position at different angles. After data collection a mathematical process is used to reconstruct a distribution of attenuation coefficients within the object that is consistent with the experimentally measured projections. The reconstruction process most commonly used is termed filtered back projection. See Reference No. (2).

As shown in FIG. 1 the projections span a finite width D. The area that is covered by all projections at different angles is called the field of view. If the centre line of each projection passes through a common point (called the centre of rotation) then the field of view is a circle of diameter D. It is a well known fact that if the field of view does not cover the whole object the parts outside the field of view will cause artifacts in the reconstructed image. See Reference No. (3). This occurs because any part outside the field of view will be intersected by some, but not all, of the projections. If the part outside the field of view is symmetric about the centre of rotation (i.e., an out-of-field annulus) then the projections will be consistent (i.e., all projections will be affected by the annulus in exactly the same way) and the resulting artifact will appear as a circularly symmetric dishing in the field of view. See Reference No. (4). The extent of the dishing will depend on the radius, the thickness, and the attenuation coefficient of the out-of-field annulus. For out-of-field parts other than an annulus, the projections will be inconsistent and the resulting artifact is less predictable.

It is clear from the preceding discussion that in conventional CT even if one wants to examine only a small part of a large object the field of view should cover the whole object. If it were possible, by some means, to restrict the field of view to the region of interest (ROI) without introducing serious artifacts then CT could be used to look at portions of large objects without necessarily increasing the size and number of projections or, alternatively, the resolution inside the ROI could be improved. Restricting the field of view to the ROI also results in a reduced dose to regions outside the ROI. This is of little consequence in non-medical CT but is a major benefit in medical CT. See Reference No. (3). Another advantage of restricting the field of view to the ROI is that matrix size and computation time may be substantially reduced.

A number of investigators have attempted to reduce the effects of out-of-field objects in CT images. See References (3), (5), (6), (7) and U.S. Pat. Nos. 4,189,775; 4,228,505, 4,305,127; 4,333,145; 4,394,738; 4,550,371. Nalcioglu et al. of Reference No. (5) initially used fine sampling in the ROI and coarse sampling elsewhere to produce a coarse reconstruction of the whole object. This was then used to correct the finely sampled portion to obtain a high resolution reconstruction of the ROI only. In a later similar investigation in the same reference they interpolated the coarsely sampled portion and combined this with the finely sampled data before reconstructing the ROI.

Wagner in Reference No. (7) proposed two methods of obtaining images of an ROI from restricted scan data with the objective of reducing patient dose. The first uses scan data of reduced intensity outside the ROI. The second requires no additional data outside the ROI but replaces the missing data by artificial data calculated from the slice outline determined using an optical scanner.

SUMMARY OF THE INVENTION

The present invention involves a new method of obtaining an artifact free image of an ROI from a restricted scan. The method, called differential region-of-interest (DROI) tomography, makes use of a complete reference object or digital image of a reference object to correct the ROI data so that it can be reconstructed using conventional means. In this regard DROI is similar to the first method of Nalcioglu. The difference is that in the DROI method of the present invention it is not necessary to scan the entire object at low resolution, low intensity or otherwise; only the ROI need be scanned. It follows that DROI scanning equipment can be simpler, more compact and less costly than conventional CT equipment. In particular, the required number of detectors and data acquisition channels can be significantly reduced.

In general, a method of generating a computed tomographic image of a region of interest of a sample according to the invention involves obtaining reference data only for the region-of-interest of a complete reference object that is a relatively good match to the sample outside the region-of-interest and has a known attenuation distribution inside the region-of-interest. Only the region of interest of the sample is scanned to obtain sample data and the reference data for the region of interest is then subtracted from the sample data to obtain differential data. From this differential data a differential image of the region of interest can be reconstructed.

The general method can be used in different applications such as to show two phase flow through a sample pipe. In this case the reference data relates to a reference pipe through which no fluid is passing and the region-of-interest is the pipe bore.

In another exemplary application, the method is used to show a defect in the crotch area of a valve casting. The reference data in this case relates to a reference casting and the region-of-interest is the crotch area of the sample valve.

BRIEF DESCRIPTION OF THE DRAWINGS

FIG. 3 is a lagged pipe (shown unassembled) which is a suitable subject for the application of the inventive technique;

FIGS. 6(a)–(d) are pseudo data CT images according to the invention showing the effects of an imperfect reference with no coordinate shift;

DESCRIPTION OF THE PREFERRED EMBODIMENTS

The theoretical basis of the invention will be explained with reference to FIG. 2. In order to reconstruct the small distribution h(x,y) enclosed by f(x,y) using conventional tomographic means it is necessary to obtain the projection or Radon transform, of the larger distribution g(x,y) where $$g(x,y) = f(x,y) + h(x,y) \qquad [1]$$

and the Radon transform of g(x,y) is according to Reference No. 8:

$$G_\theta(\tau) = \int_{-\infty}^{\infty} \int_{-\infty}^{\infty} g(x, y)\delta(x\cos\theta + y\sin\theta - \tau)dxdy \qquad [2]$$

where $\delta$ is the Dirac delta function.

Figure 2:
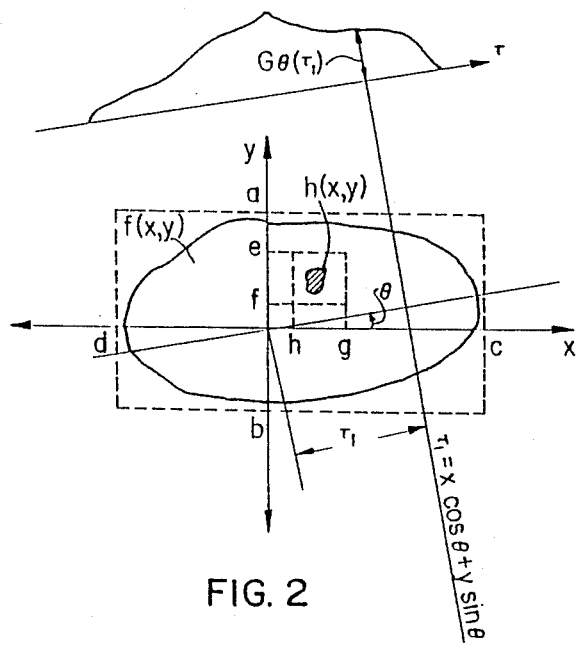
FIG. 2 is an illustration of the distribution used in explaining the theoretical basis of the present invention.

Assuming g(x,y) is completely enclosed by the rectangle defined by a, b, c and d, in FIG. 2 the limits in [2] are $$G_\theta(\tau) = \int_b^a \int_d^c g(x, y)\delta(x\cos\theta + y\cos\theta - \tau)dxdy \qquad [3]$$

From the linearity of the Radon transform function and [1] we have $$H_\theta(\tau) = G_\theta(\tau) - F_\theta(\tau) \qquad [4]$$

where $$H_\theta(\tau) = \int_b^a \int_d^c h(x, y)\delta(x\cos\theta + y\sin\theta - \tau)dxdy \qquad [5]$$

$$F_\theta(\tau) = \int_b^a \int_d^c f(x,y)\delta(x\cos\theta + y\sin\theta - \tau)dxdy \quad [6]$$

Clearly, if both $G_\theta(\tau)$ and $F_\theta(\tau)$ are known then $H_\theta(\tau)$ can be calculated from [4]. Provided there is sufficient angular sampling, the function h(x,y) can be obtained from $H_\theta(\tau)$ using normal reconstruction methods. However, if from the outset the only objective is to obtain a reconstruction of h(x,y), then the usefulness of [4] is further enhanced. As shown below, both $G_\theta(\tau)$ and $F_\theta(\tau)$ in [4] can be limited to a smaller ROI, for example, the ROI defined by e, f, g and h in FIG. 2. Writing $$G_\theta(\tau) = G_\theta'(\tau) + G_\theta''(\tau) \quad [7]$$

$$F_\theta(\tau) = F_\theta'(\tau) + F_\theta''(\tau) \quad [8]$$

where $$\begin{aligned} G_\theta(\tau) &= G'_\theta(\tau) & f \leq y \leq e \\ & & h \leq x \leq g \\ &= G''_\theta(\tau) & \text{otherwise} \\ F_\theta(\tau) &= F'_\theta(\tau) & f \leq y \leq e \\ & & h \leq x \leq g \\ &= F''_\theta(\tau) & \text{otherwise} \end{aligned}$$

and substituting [7] and [8] into [4] we have $$H_\theta(\tau) = G_\theta'(\tau) - F_\theta'(\tau) + G_\theta''(\tau) - F_\theta''(\tau). \quad [9]$$

Clearly, if $G_\theta''(\tau) = F_\theta''(\tau)$ in [9] we have $$H_\theta(\tau) = G_\theta'(\tau) - F_\theta'(\tau). \quad [10]$$

Thus, provided $F_\theta'(\tau)$ is known and $F_\theta(\tau)$ and $G_\theta(\tau)$ are relatively closely matched (ideally equal) outside of the ROI the reconstruction of h(x,y) can be obtained with considerably less data than would normally be required. This technique is termed differential region-of-interest (DROI) tomography and is summarized in FIG. 15. The $G_\theta'(\tau)$ are scan data derived from the object of interest (i.e., sample data) and the $F_\theta'(\tau)$ are the scan data derived from a reference object (i.e., reference data). As discussed in the following sections, $F_\theta'(\tau)$ may be derived from an actual reference object or a digital image of a reference object.

The reduction in the scan data requirements using the inventive technique is derived as follows.

Figure 1:
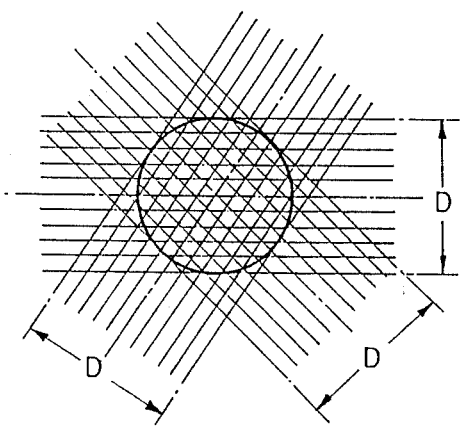
FIG. 1 is a transverse and angular scanning pattern used in CT.

In practice, the continuous Radon transform is experimentally estimated from discrete, continuous measurements in both $\tau$ and $\theta$ (see FIG. 1). The required number, $n_c$, of discrete measurements in $\tau$ (i.e., the required number of rays per projection), is related to the image spatial resolution w, and the scan circle diameter D, according to Reference No. by (9) by:

$$n_c = 2\frac{D}{w} \quad [11]$$

As explained in Reference No. (9), the required number of projections per image, m, is related to w and D', the diameter of the region over which w can be realized by:

$$m = \frac{\pi D'}{w} \quad [12]$$

For a conventional scan D'=D and the required number of projections, $m_c$, is $$m_c = \frac{\pi D}{w} \quad [13]$$

The total number of measurements required to create a conventional scan, $M_c$, is given by the product of [11] and [13]

$$M_c = 2\pi \left(\frac{D}{w}\right)^2 \quad [14]$$

In DROI tomography D and D' can be reduced to d, the diameter of a circle just large enough to encompass the ROI. Consequently, for a DROI image, the number of rays per projection $n_d$, and the number of projections $m_d$ are given by:

$$n_d = \frac{2d}{w} \quad [15]$$

$$m_d = \frac{\pi d}{w} \quad [16]$$

The total number of measurements required to create a DROI image is the product of [15] and [16] and an additional factor, b, that accounts for the differential nature of the technique:

$$M_d = 2\pi b \left(\frac{d}{w}\right)^2 \quad [17]$$

where
  b=2 if the DROI reference is an actual reference object scanned in the same way that the object of interest is scanned, and
  b=1 if the DROI reference is a digital image of a reference object.

Thus, the amount of scan data required for DROI image relative to a conventional image is given by $$\frac{M_d}{M_c} = b\left(\frac{d}{D}\right)^2 \quad [18]$$

Figure 17:
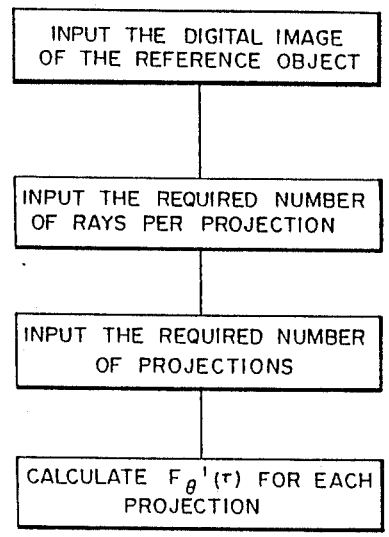
FIG. 17 is a summary of steps used in a computer program designed to perform simulated CT scanning of a digital image.
Figure 16:
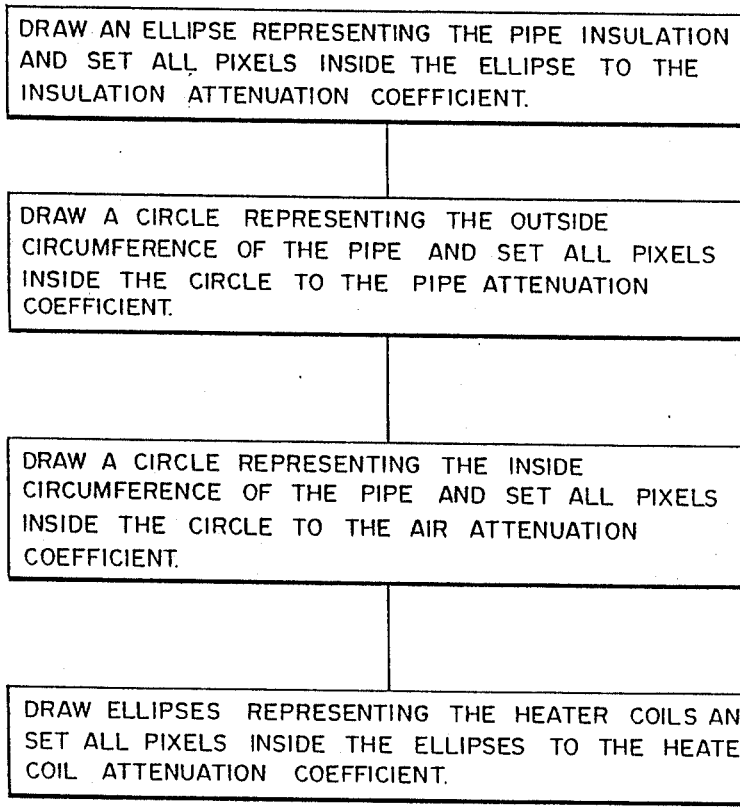
FIG. 16 is a summary of steps used to create the digital images at the top of FIGS. 6(c) and 6(d)

If, for example, the DROI image diameter is D/10 and if a digital image of reference object is used for a reference as shown in FIG. 16 and FIG. 17 then b=1 and, from [18], the DROI image can be obtained with 1/100th the number of measurements required for a conventional image of diameter D.

If an actual reference object, as opposed to a digital image of a reference object is used then b=2 in [18] and the DROI image requires 1/50th the number of measurements, still a substantial reduction in the amount of data required.

The reduction in the total amount of data required for DROI images relative to conventional images implies that:

(a) scanning equipment may be simpler and cheaper; for fan beam scanners in particular the required number of detectors and data acquisition channels is reduced by d/D,
(b) the total scan time may be shorter (see the discussion below)
(c) the memory requirements and computation time for reconstruction may be reduced, and
(d) the spatial resolution in the ROI may be improved beyond limitations that would normally be imposed by the size of the object.

One or more of these advantages may be relevant in a given application of the DROI technique.

The reduction of the total scan time using the inventive technique will now be derived. For a filtered back projection reconstruction performed using a ramp filter with Nyquist frequency cut-off, according to Reference No., (10):

$$\sigma_{ij}^2 = \frac{\pi^2}{3w^2 m^2} \sum_{k=1}^{m} \left( \frac{1}{N_k} \right) \quad [19]$$

where:
$\sigma_{ij}$ is the variance of the attenuation coefficient at a particular location (i, j), and
$N_k$ is the number of unscattered photons per ray that passed through location (i, j) and were detected in the $k^{th}$ projection.

The subscript (i, j) on $\sigma^2$ implies that only those photons that have passed through the element (i, j) contribute to the variance in that element and that the variance will normally be different from one element to the next. A simplified form of [19] is obtained by considering a special element (i, j) for which $N_k = N$ for all k. This is true for the centre element of an axially symmetric object. For this special case [19] reduces to:

$$\sigma^2 = \frac{\pi^2}{3w^2 mN} \quad [20]$$

The factor N can be expressed as the product of count rate through a diameter, I, and count time per ray, t:

$$N = It \quad [21]$$

Substituting [21] in [20] gives:

$$\sigma^2 = \frac{\pi^2}{3w^2 mIt} \quad [22]$$

The analysis that follows is based on [22] with the understanding that the results are only strictly true for the centre of an axially symmetric object. However, for most objects, the change in $\sigma^2$ from centre to periphery is limited to 10% to 20%, depending on the attenuating power and shape of the object. Consequently, the assumption that $\sigma$ is constant across an image is an acceptable approximation for most purposes.

A DROI image is mathematically equivalent to the difference between conventional tomographic images of the sample and reference objects. Consequently, the variance associated with a DROI image, $\sigma_d^2$, is given by:

$$\sigma_d = \sigma_s^2 + \sigma_r^2 \quad [23]$$

where
the d, s and r subscripts used here and below denote differential, sample and reference, respectively.

Substituting [22] in [23] and rearranging terms gives $$t_s = \frac{\pi^2}{3w^2 m_d \sigma_d^2 I_s} \left( 1 + \frac{I_s t_s}{I_r t_r} \right) \quad [24]$$

where $$m_d = m_s = m_r.$$

The scan time per ray for a DROI data set, $t_d$, is the sum of $t_s$ and $t_r$, thus $$t_d = t_s (1 + t_r/t_s). \quad [25]$$

Substituting [24] in [25] gives $$t_d = \frac{\pi^2}{3w^2 m_d \sigma_d^2 I_s} \left[ 1 + \frac{I_s t_s}{I_r t_r} \right] \left( 1 + \frac{t_r}{t_s} \right). \quad [26]$$

For a conventional scan [22] is written as $$\sigma_c^2 = \frac{\pi^2}{2w^2 m_c I_c t_c} \quad [27]$$

where
the c subscript denotes conventional conditions.

If the objective is to have $\sigma_d^2 = \sigma_c^2$ then the relative count time per ray $t_d/t_c$, is, from [26] and [27]:

$$\frac{t_d}{t_c} = \frac{m_c}{m_d} \left( 1 + \frac{I_s t_s}{I_r t_r} \right) \left( 1 + \frac{t_r}{t_s} \right). \quad [28]$$

where
$I_c = I_s$ by definition.

The total scan time for a DROI scan, $T_d$, is given by $$T_d = \frac{M_d t_d}{b_p} \quad [29]$$

where
p is the number of detectors scanning the diameter, d, i.e., p is the number of simultaneous measurements that can be taken through the DROI.

Similarly, the total scan time for a conventional scan, $T_c$, is given by $$T_c = \frac{M_c t_c}{q} \quad [30]$$

where
q is the number of detectors scanning the diameter D, i.e., q is the total number of measurements that can be taken simultaneously.

Dividing [29] by [30] and substituting [18] for $M_d/M_c$, [28] for $t_d/t_c$, [13] for $m_c$ and [16] for $m_d$ gives $$\frac{T_d}{T_c} = \frac{qd}{pD}\left(1 + \frac{I_s t_s}{I_r t_r}\right)\left(1 + \frac{t_r}{t_s}\right). \qquad [31]$$

Thus, the total DROI scan time relative to conventional scan time, $T_d/T_c$, is proportional to $d/D$ even though the required number of DROI measurements relative to the conventional requirements $M_d/M_c$ is proportional to $(d/D)^2$ (see Equation [18]). This somewhat surprising situation is a result of the dependence of $\sigma^2$ on m (see Equation [22]) and, in turn, the dependence of m on d (see Equation [12]). Equation [28] shows the relationship between scan times most clearly. It shows that if an $m_d$ smaller than $m_c$ is chosen, but at the same time there is to be no increase in $\sigma_d^2$ relative to $\sigma_c^2$, then the relative scan time per ray, $t_d/t_c$, must be increased by an amount proportional to $m_c/m_d$. Thus, for $\sigma^2$ constant, total scan time is not reduced by reducing the number of projections but by reducing the number of rays per projection.

If for example, a DROI image is obtained using a reference scan with $t_r=t_s$ and $I_r \approx I_s$ (i.e., the difference between the sample and reference objects is such that the difference in count rate through their diameters is small) then $$\frac{T_d}{T_c} = 4\frac{qd}{pD} \qquad [32]$$

For a single detector or so-called "first generation" scanner or for a second generation scanner having k detectors defining a fan of width less than $d/2$ at the centre of rotation, $p=q$ and [32] reduces to $$\frac{T_d}{T_c} \approx 4\frac{d}{D} \qquad [33]$$

Thus, total DROI scan time is less than the total conventional scan time only if $d<D/4$.

For a third or fourth generation scanner having detectors defining a fan of width D at the centre of rotation, $p/q=d/D$, i.e., the number of detectors spanning the ROI scales with d. Under these circumstances the number of detectors and data acquisition channels is reduced but there is a time penalty of a factor of 4 associated with the DROI, i.e., from [32]

$$T_d \approx 4T_c \qquad [34]$$

Aside from considerations of total DROI scan time, there is also the question of how the total time should be divided between sample and reference scans. Differentation of [26] with respect to $t_r/t_s$ shows that the $t_d$ required to achieve a given $\sigma_d^2$ is minimum (or conversely, the $\sigma_d^2$ achieved in given $t_d$ is minimum) when $$\frac{t_r}{t_s} = \sqrt{\frac{I_s}{I_r}} \qquad [35]$$

If r similar DROI images are to be produced, each using the same reference scan it can be shown that $$\frac{T_d}{T_c} \frac{qd}{pDr}\left(1 + \frac{I_s t_s}{I_r t_r}\right)\left(r + \frac{t_r}{t_s}\right) \qquad [36]$$

and the most efficient division of sample and reference scan time exists when $$\frac{t_r}{t_s} = \sqrt{r\frac{I_s}{I_r}} \qquad [37]$$

If for example, $I_r=4I_s$ and $r=3$ (i.e., 3 DROI images are to be produced using the same reference scan), then the most efficient division of $t_s$ and $t_r$ is, from [37], $t_r=0.87t_s$.

Finally, if a noise-free mathematical model, as opposed to an actual reference scan, is used to create the DROI then $\sigma_r^2$ in [23] equals zero and [36] reduces to $$\frac{T_d}{T_c} \frac{qd}{pD}. \qquad [38]$$

In order to use the DROI technique it is necessary to have:
 (a) a reference scan of the ROI ($F_\theta'$ ($\tau$) in [10]), and
 (b) a relatively good match between the sample scan and reference scan outside the ROI ($G_\theta''$ ($\tau$)=$F_\theta''$ ($\tau$) in [9]).

In many applications of industrial CT, reference objects, whether they be actual objects or digital images of reference objects are readily available. However, it is not always possible to ensure that there is a relatively good match between the sample scan and the reference scan outside the ROI. Imperfections or artifacts in the DROI image caused by reference mismatch are therefore a concern.

Mismatch between sample and reference scans may result from the use of:
 (a) an otherwise perfect reference that is translated and/or rotated with respect to the sample (termed coordinate shift mismatch),
 (b) an imperfect reference with no coordinate shift, or
 (c) a combination of (a) and (b).

Studies using analytically calculated projection data (termed "pseudo-data") were carried out to illustrate the effects of various types and severities of mismatch on DROI images of two-phase flow. The characterization of two-phase flow as a function of pressure, temperature and other variables is of practical importance in a number of industrial processes and tomographic imaging can be a useful tool for this purpose. However, in many instances, the pipe containing the flow is thick-walled and insulated as shown in FIG. 3. More specifically, thick walled steel pipe 10 has a resistance heater 12 wound therearound and is adapted to be received within an insulating sleeve 14. If the objective is to obtain an image of the two-phase flow only, DROI tomography, using a scan of the empty assembled pipe as a reference, is advantageous.

Using pseudo data it is possible to study the effects of mismatch in the absence of image noise due to photon statistics.

Figures 4A, 4B:
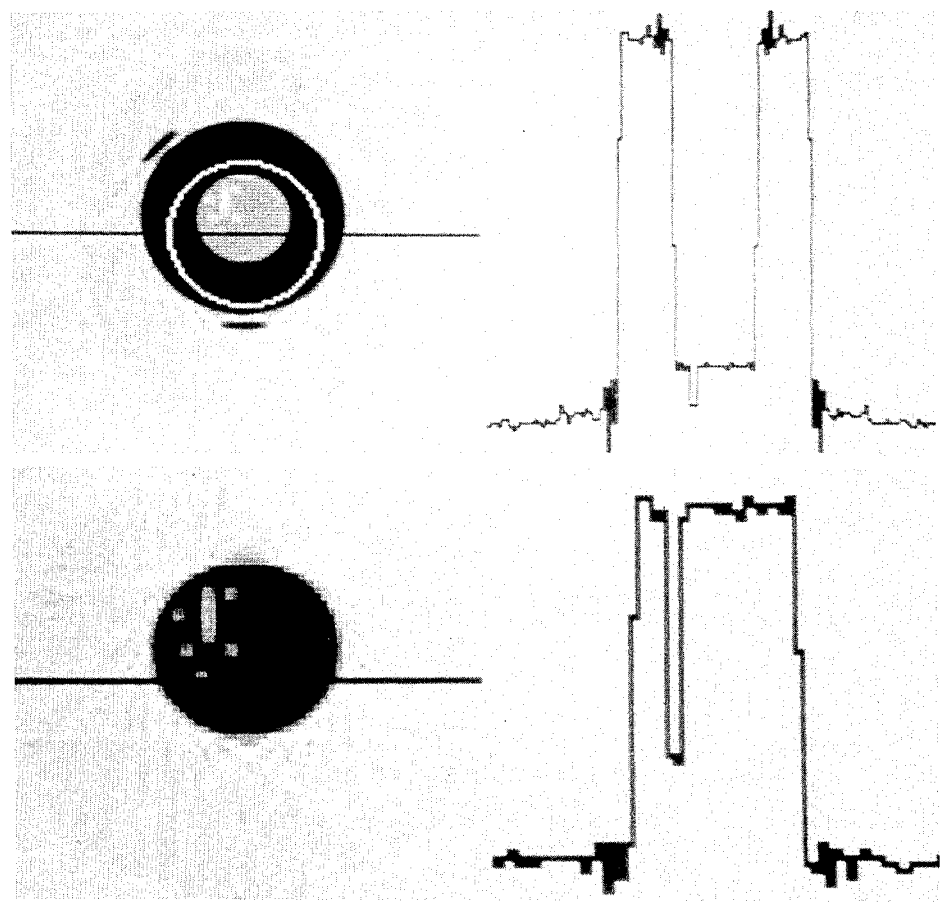
FIGS. 4(a) and 4(b) are pseudo data CT images of an air/water mixture in the pipe of FIG. 3 together with attenuation profiles, with FIG. 4(a) representing a conventional image and FIG. 4(b) representing an image using the inventive method.

A conventional CT image (FIG. 4(a)) was reconstructed from pseudo data of an insulated steel pipe like that shown in FIG. 3 but containing a two-phase mixture of air and water. The two-phase mixture and the pipe, pipe insulation and wraparound heater coils are all faithfully reproduced in the CT image as portions 16, 18, 20 and 22 respectively, and their relative densities are plotted in the profile at the right. The outline 24 of the ROI selected for reconstruction using the DROI technique is also superimposed on this image. Note that this ROI is not concentric with the bore of the pipe.

The DROI image obtained for this ROI using a perfectly matched reference scan of the empty pipe is simply an image of the two-phase mixture 16 alone (see FIG. 4(b)). As the theory predicts, the DROI image is totally free of image artifacts. Furthermore, the attenuation coefficients in the DROI image are quantitatively correct and unchanged with respect to the conventional image. Had this been experimental scan data collected on a first generation scanner, the scanning equipment need only have traversed the ROI diameter (40 pixels) as opposed to the diameter of a circle encompassing the insulation and concentric with the centre of rotation (120 pixels). Alternatively, if the data had been collected on a third generation scanner, the number of detectors and detector channels could have been reduced by the same amount. From [18], the total amount of scan data required for a single DROI image, relative to a single conventional image of this type would have been reduced by a factor of approximately 4.5 (b=2) or 9 (b=1). Assuming p=q and $I_s \simeq I_r$ the total scan time required for 9 such images, all using the same reference scan (r=9) would be, from [37], minimum for $t_r=3t_s$ and, using this result in [36], would be equal to approximated 0.6 times the total time required to obtain data for 9 conventional images.

Figure 5A:
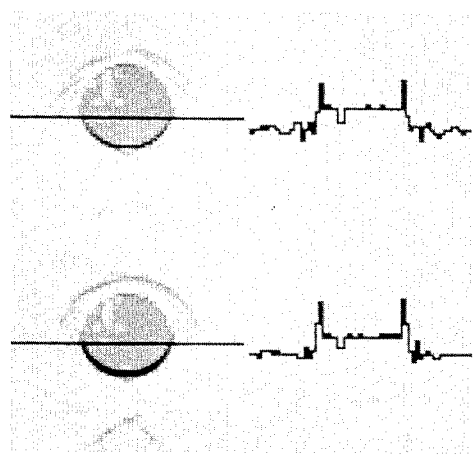
FIGS. 5(a)–(d) are pseudo data CT images according to the invention showing the effects of coordinate shift mismatch together with attenuation profiles.
Figure 5B:
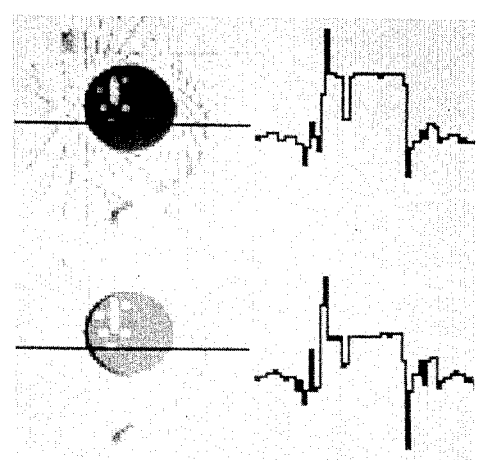

The pseudo-data DROI images shown in FIG. 5(a) were obtained with an otherwise perfectly matched reference scan shifted downwards 1 and 2 pixels (top and bottom images, respectively) and FIG. 5(b) shows the case where the perfectly matched reference scanning is shifted downwards 3 and 4 pixels (top and bottom image, respectively) with respect to the sample scan. The effects of the mismatch are evident in the attenuation profiles shown at the right of each image. The overshoot 26 at the periphery of the bore is due to the difference in attenuation between the steel pipe of the sample scan and the empty bore of the reference scan. In each case the mismatch artifacts are restricted to the periphery of the bore and the centre area is unaffected.

Figure 5C:
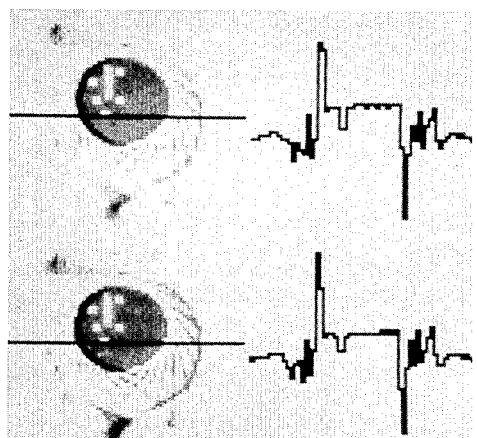
Figure 5D:
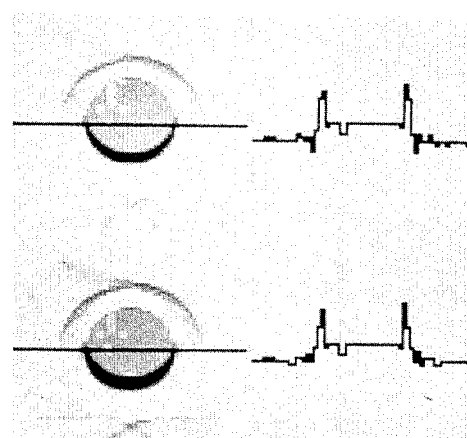

FIG. 5(c) shows DROI images obtained with an otherwise perfectly matched reference scan rotated counterclockwise about the centre of the ROI 2.8° and 5.6° (top and bottom images, respectively) and FIG. 5(d) shows the case where the reference scan is rotated 8.4° and 11.2° (top and bottom images, respectively) with respect to the sample scan. As before, the effects of the mismatch are evident in the attenuation profiles to the right of each image. The overshoot 26 in each profile is due to the difference in attenuation between the steel pipe of the sample scan and the empty bore of the reference scan. Similarly, the undershoot 27 is due to the difference between the attenuation of the water in the bore of the sample scan and the steel pipe of the reference scan. As before, all artifacts are restricted to the periphery of the bore.

The magnitude of the mismatch artifacts in terms of attenuation value is relatively independent of the extent of mismatch for all the examples in FIG. 5. However, it is anticipated that for mismatches of a fraction of a pixel the attenuation values assigned to the artifact will decrease more or less linearly with the extent of the mismatch.

The spatial extent of the artifact does depend on the extent of the mismatch, as is evident from the progressive obscuring of the upper left air bubbles in the images as the coordinate mismatch increases in severity. Note that if the ROI has been concentric with the bore the rotational mismatch would have been greatly reduced because of axial symmetries.

The apparent change in scale in the attenuation profiles in FIG. 5 with respect to those in FIG. 4 is caused by the overshoot and undershoot in the images. Despite this, the water attenuation coefficient in areas unaffected by the artifacts were found to be quantitatively correct.

Pseudo data DROI images of the same ROI but obtained using an imperfect reference with no coordinate shift are shown in FIGS. 6(a)-(d). The top image in FIG. 6(a) was obtained by rotating the elliptical insulation in the reference through 90°. The attenuation profile indicates that the DROI image in virtually unaffected by this mismatch. Removing the insulation altogether has a more significant effect, as shown by the bottom image in FIG. 6(a). This artifact is consistent with the out-of-field annulus dishing discussed in Reference No. (4).

Shifting the lower heater coil two pixels to the right (top image of FIG. 6(b)) appears to produce no detectable artifact within the DROI and removing it altogether (bottom image of FIG. 6(b)) gives much the same result.

All images presented thus far have been reconstructed from pseudo-data derived from analytic equations describing the insulated pipe. In order to test for mismatch artifacts that may occur as a result of using a digital image as a reference object, a 64×64 pixel image of the insulated pipe was created (FIG. 6(c), top image).

Digital images like those at the top of FIGS. 6(c) and 6(d) can be created using virtually any commercially available graphics system capable of drawing shapes and assigning values to them. The shapes represent the features in the reference object and the values assigned represent the attenuation coefficients of the features. The digital images shown at the top of FIGS. 6(c) and 6(d) were created using the steps shown in FIG. 16. More irregularly shaped objects can be represented as digital images using any combination of circles, ellipses, rectangles, lines and individual pixels. Digital images of reference objects may also be created by suitably modifying any available image of the reference object, whether it be from a CT image, from a photograph or from a computer aided design (CAD) system. It is anticipated that, in many applications of the DROI technique, the reference object will be a digital image obtained by suitably modifying an image originally produced using a CAD system.

Having obtained a digital image of the reference object, projection data through the region-of-interest of the reference object can be obtained by applying a discrete form of Equation [6] where the integral boundaries are restricted to the boundaries of the region-of-interest and f(x,y) represents the digital image. The data obtained is $F_\theta'(\tau)$ in Equation [8]. The number of rays per projection and the number of projections per image used are equal to the corresponding values for the corresponding sample scan.

Normally, because of the amount of data involved, a computer program based on [6] is used to calculate $F_\theta'$ (τ). A summary of the key steps used in this type of program is shown in FIG. 17. Essentially, such a program performs a simulated CT scan of a digital image of a reference object to obviate the need to perform an actual CT scan of an actual reference object which, in some circumstances, may be difficult or impossible to carry out.

Figure 15:
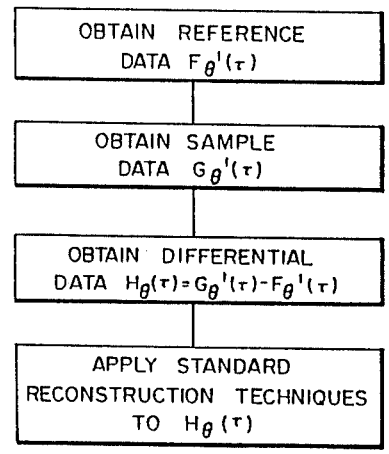
FIG. 15 is a summary of steps showing the general method of differential region-of-interest tomography.

Reference data obtained from a digital image is used in exactly the same way as reference data obtained from an actual object to produce a DROI image i.e., the $F_{\theta}'(\tau)$ in FIG. 15 can be obtained either way without affecting the basic process.

A simulated CT scanning program like that outlined in FIG. 17 was used to collect projection data from FIG. 6(c) (top) and, following the steps in FIG. 15, a DROI image was created (bottom image of FIG. 6(c)).

The coarseness of the reference image is the source of the excessive noise in the DROI image but, despite this noise, the bubbles can still be faintly discerned. DROI image quality is somewhat improved by using a 128 pixel×128 pixel reference image (top image of FIG. 6(d)) although the noise in the DROI image (bottom image of FIG. 6(d)) is still significant. It is anticipated that, had a still better resolution been used for the reference image (such as the 1024×1024 resolution typical of modern CAD systems) the DROI image would have been of the same quality as that shown in FIG. 4.

All DROI images in FIG. 6, except the one obtained using a reference object with the insulation removed altogether, are quantitatively correct representations of the attenuation coefficient of water. The water attenuation coefficients in the exception (bottom imge of FIG. 6(a)) is approximately 34% too high. An overestimate of this magnitude is to be expected since the missing insulation causes the differential attenuation to be larger in magnitude by an amount related to the attenuation in the insulation.

The DROI technique is most beneficial when the DROI is significantly smaller than the object in which it lies. This situation occurs in a variety of industrial applications. The simulation used in the previous section is one example of this.

Figure 7A:
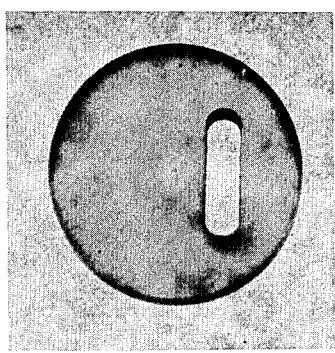
FIGS. 7(a)–(c) are photographs of annular flow simulations.
Figure 7B:
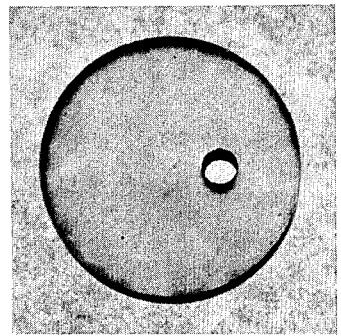
Figure 7C:
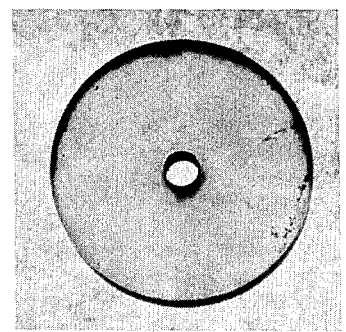
Figure 7D:
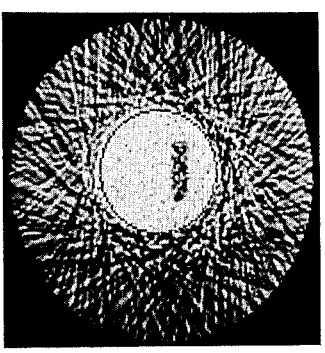
FIGS. 7(d)–(f) are tomographic reconstructions according to the invention with FIGS. 7(d), (e) and (f) corresponding respectively, to FIGS. 7(a), (b) and (c)
Figure 7E:
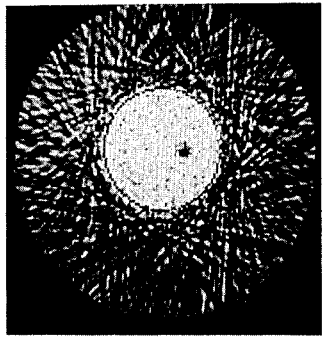
Figure 7F:
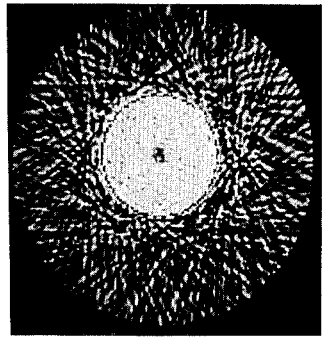
Figure 8C:
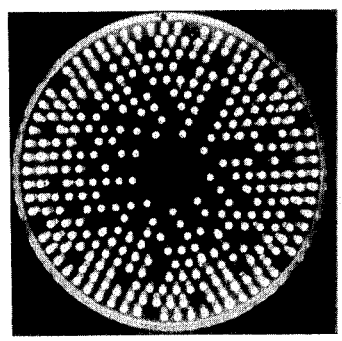
FIGS. 8(a)–(c) are photographs of bubbly flow simulations.
Figure 8F:
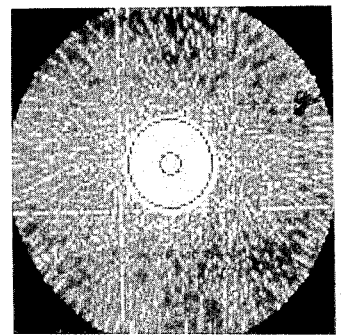
FIGS. 8(d)–(f) are tomographic reconstructions according to the invention with FIGS. 8(d), (e) and (f) corresponding, respectively, to FIGS. 8(a), (b) and (c)
Figure 8B:
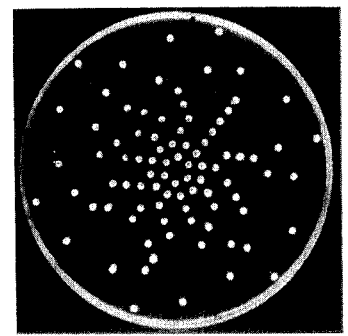
Figure 8E:
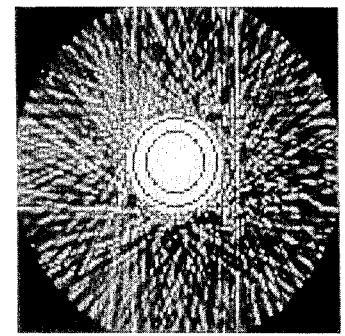
Figure 8A:
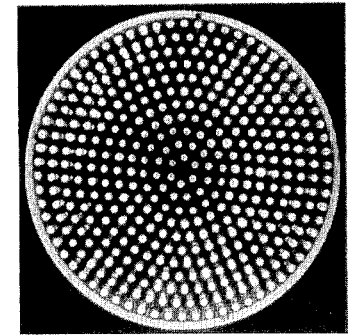
Figure 8D:
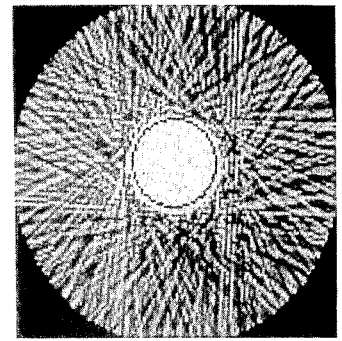
Figure 9A:
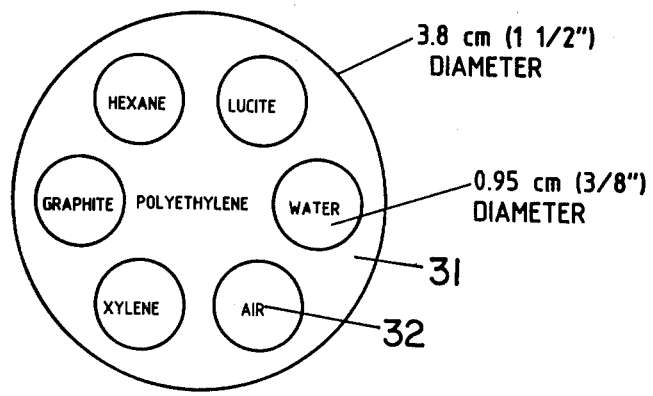
FIG. 9(a) is a schematic cross-section of a linearity test insert.
Figure 9B:
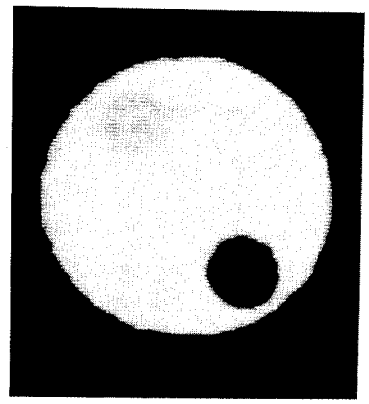
FIG. 9(b) is a tomographic reconstruction according to the invention of the cross-sectional view of FIG. 9(a)
Figure 10:
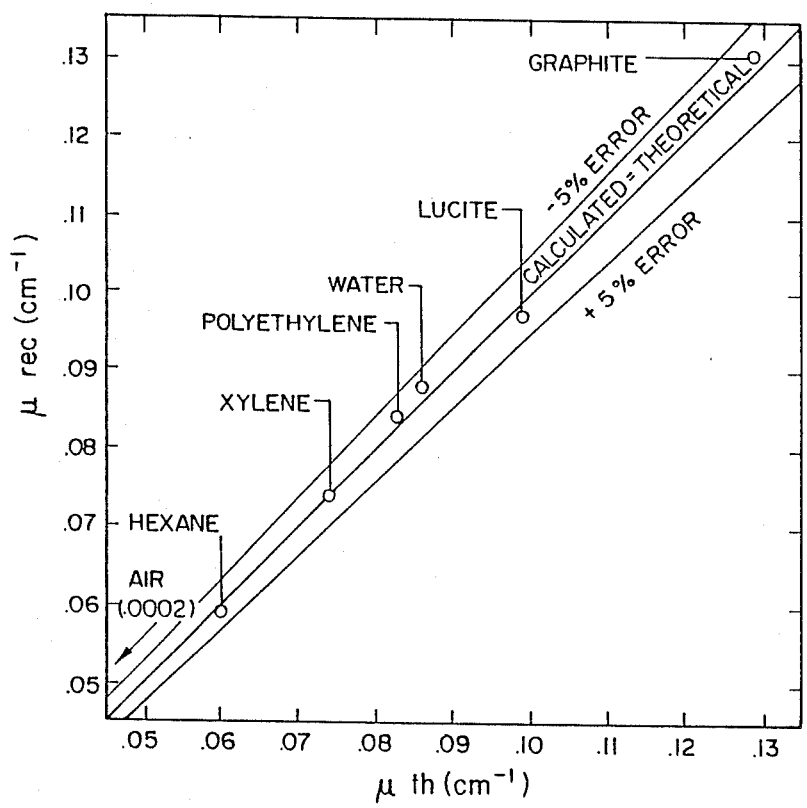
FIG. 10 is a graph of reconstructed versus linear attenuation coefficients for the image of FIG. 9(b)

To experimentally verify the DROI technique the steel pipe shown in FIG. 3 was tomographically imaged using the DROI technique and a general purpose translate-rotate laboratory scanner. More specifically, a circular ROI encompassing the bore was scanned with the bore full to provide sample data and with the bore empty to provide reference data. The reference data were subtracted from the sample data and the resulting data were reconstructed to obtain the DROI images. A variety of lucite inserts 28 (FIGS. 7(a) (b) and (c) and FIGS. 8(a) (b) and (c)) were used to simulate different two-phase flow conditions in the sample data. The DROI images of FIGS. 7(d) (e) and (f) have relatively good spatial resolution but high noise (w=1.52 mm, $\sigma/\mu$=37%). The DROI images 8(d) (e) and (f) are of low noise but poor spatial resolution (w=2.24 mm, $\sigma/\mu$=9%). In both examples the images are quantitatively accurate, artifact free representations of the inserts. Void fractions determined from the DROI images in the regions enclosed by the circles 30 overlayed on these images were found to be in close agreement with the true values. The quantitative accuracy and linearity of the DROI technique was further verified using a single polyethylene insert 31 (FIG. 9(a)) containing a selection of materials—hexane, lucite, water, air, xylene and graphite in the specific example chosen—disposed in separate circular regions 32 around insert 31. FIG. 9(b) shows the DROI image obtained with $\sigma/\mu$=3.9% (relative to lucite) and w=2.03 mm. An outline of the small region used for quantitative analysis of each material is shown at 33 over the hexane section. FIG. 10 shows that for each material the experimental coefficients determined from the DROI image is written ±5% of the true value.

DROI tomography can also be used to image two-phase flow in the more complex geometries found in simulated reactor fuel channels. These channels are constructed with the objective of verifying computer code predictions of local density and velocities in sub-channels formed by arrangements of fuel pencils. The region-of-interest, the two-phase flowing regions which are typically located in the centre of the test section, has a diameter which may be smaller than ⅓ of the section diameter. Thus, the DROI technique can reduce scanning time and/or the requisite number of detectors and detector channels. Aside from this advantage, the differencing technique, in conjunction with an air/water difference normalization, can calibrate out partial volume effects in the data. See Reference No. (11).

The DROI technique may also find application in imaging through explosion proof or heat reflecting shields. For example, tension members such as ropes and cables under test conditions are equipped with shields because the explosive force of the member on failure is a hazard to equipment and personnel. The DROI technique could be used to image the member alone without having to compromise safety by removing the shield. Similar shields around rock cores under compressive loads present no problem using the DROI technique. In this case the DROI technique also provides a means of imaging the sample without having to image parts of the compressive tester itself.

Figure 11:
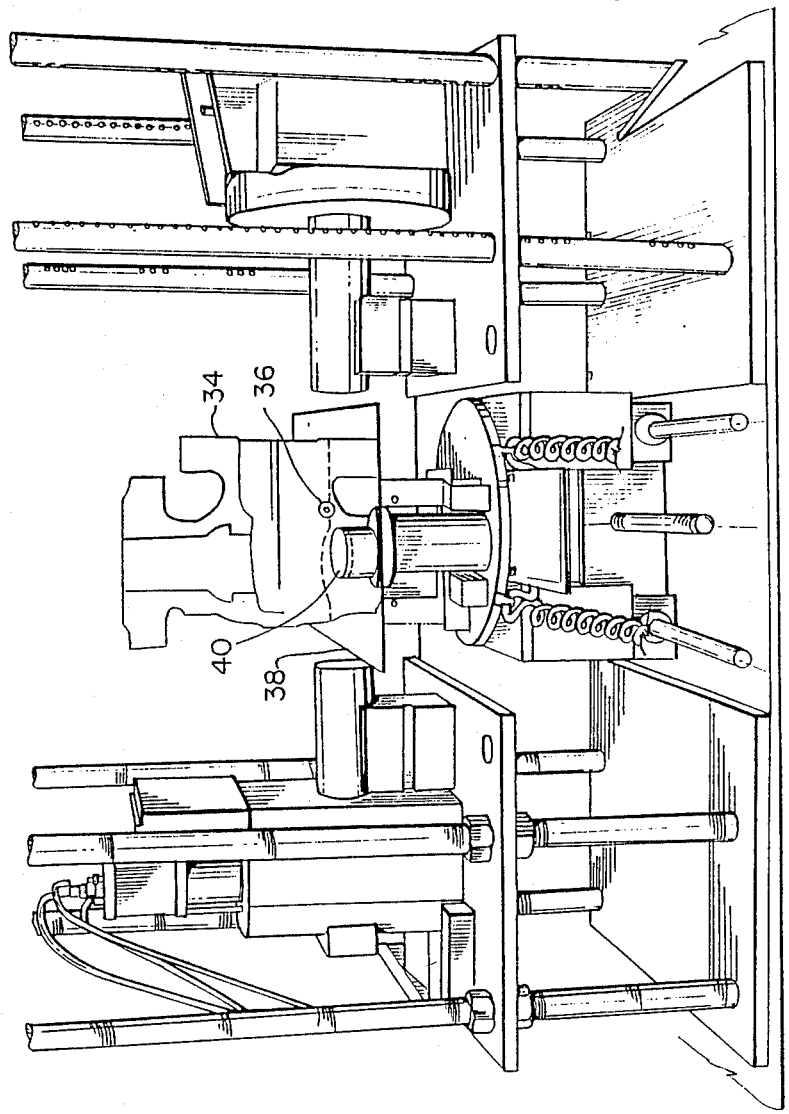
FIG. 11 illustrates a valve casting and a test pattern mounted on the turn table of a first generation CT scanner.

The DROI technique may also be applied to quality control of manufactured items. For example, valve castings to be used in critical applications must be inspected for defects such as shrink cavities which, like a crack, can propagate under vibration. See Reference No. (12). These cavities are caused by uneven solidification of liquid metal in the mold and often occur in regions where external and internal surface contours change rapidly. The crotch area between the bore and stem ports of a gate valve is a typical example of this. The gate valve 34 shown in FIG. 11 has an inlet to outlet length of 28 cm and has been bisected along a plane passing through the bore and stem port axes to reveal a shrink cavity 36 in the crotch area. In a previous study (12) a series of six conventional CT images, parallel to the scan plane 38 shown in FIG. 11, were obtained in order to fully characterize the defect (FIG. 12). Each image has a spatial resolution of 1.72 mm and was reconstructed from 256 rays per projection. (Because of the shape of the valve, the test pattern 40 inserted in each image did not result in any additional increase in the scan circle diameter.). The large subsurface cavity 36 is particularily evident in images 12(c) and 12(d).

Figure 12A:
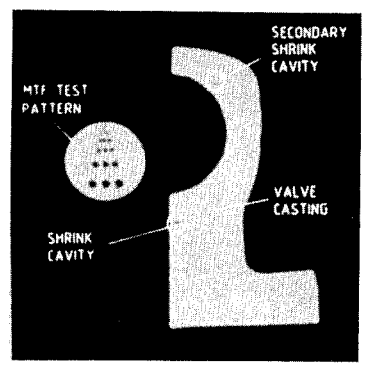
FIGS. 12(a)–(f) are conventional tomographic images through six parallel planes in the valve casting illustrated in FIG. 11.
Figure 12B:
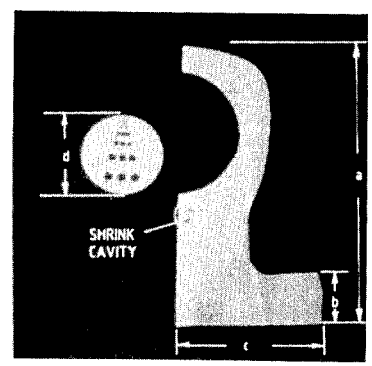
Figure 12C:
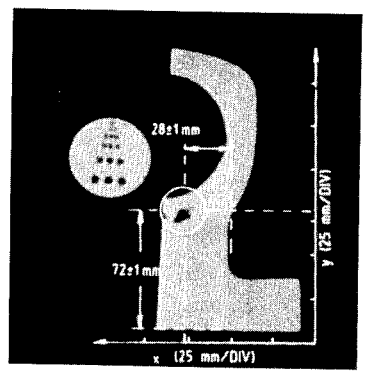
Figure 12D:
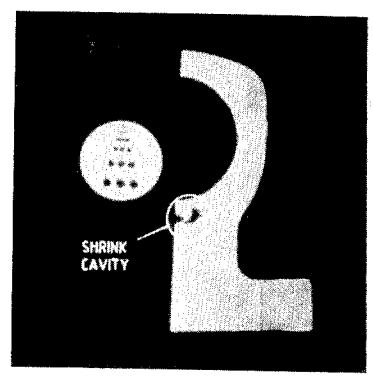
Figure 12E:
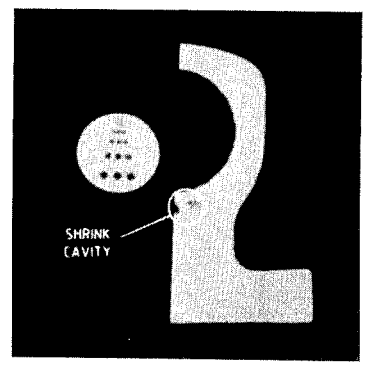
Figure 12F:
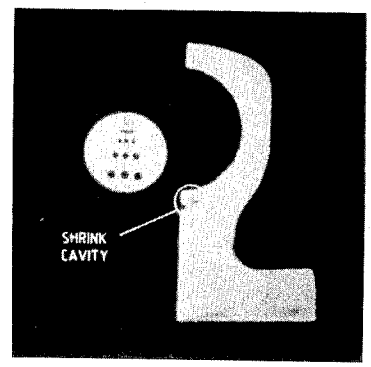
Figure 13:
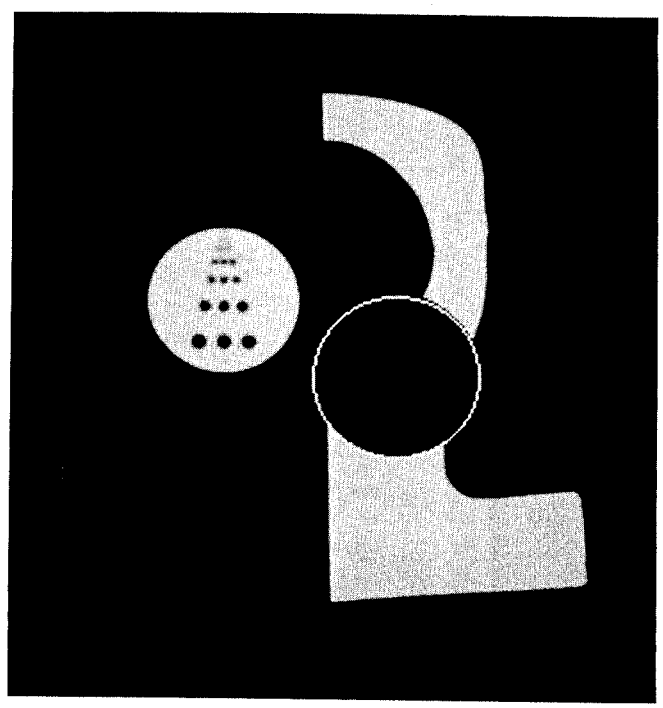
FIG. 13 is a digital image of the valve casting in the scan plane of FIG. 11(d)

In the present study a digital image of FIG. 12(d) was created with the attenuation coefficients inside the intended ROI set to zero (FIG. 13).

In FIG. 13, the ROI is the portion of the image enclosed by circle 42. Following the procedure laid out in FIG. 17 this image was mathematically scanned to generate the requisite reference data.

Figure 14:
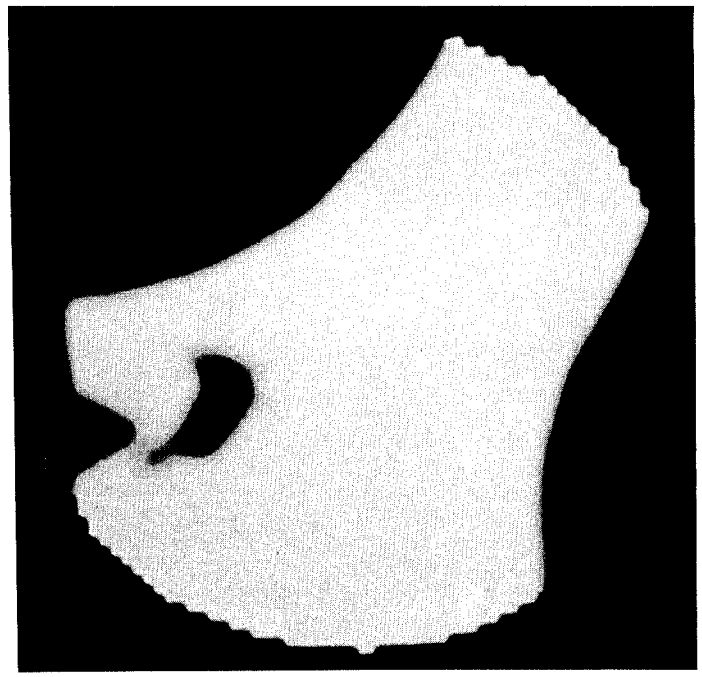
FIG. 14 is a differential region of interest image of FIG. 11(d) in the area enclosed by the circle in FIG. 12.

Following the procedure laid out in FIG. 15 these reference data were then subtracted from the sample data to obtain a DROI image (FIG. 14).

Only those rays that intersected the ROI (i.e., the middle 64 rays of each projection) were used to create the DROI. Thus, the amount of measured data used to create the DROI image was ¼ that required for a conventional image. For a multidetector scanner this could mean a factor of 4 reduction in the number of detectors and detector channels.

For larger valves and other castings the relative advantage of the DROI technique will be even greater, provided that the size of the required ROI remains the same. For any object that is large relative to the required spatial resolution, w the DROI technique may be the only way to make CT a viable inspection technique.

As described above, differential region-of-interest (DROI) tomography is a method of producing artifact-free tomographic images of a region-of-interest (ROI) in an object using projections of the ROI only. Normally, projections of the entire object would be required for this purpose. The implications of this are that the DROI scanning equipment can be simpler, more compact and less costly than conventional CT equipment. In particular, the required number of detectors and data acquisition channels can be significantly reduced. Furthermore, the total scan time may be shorter, computational memory and time requirements may be reduced and the spatial resolution may be improved beyond normal limitations imposed by object size. The required number of DROI measurements, relative to conventional CT measurements, is proportional to the square of the ratio of the image diameters while, for the same image noise, the total DROI scan time relative to conventional scan time is proportional to the ratio of the image diameters. Mismatch artifacts in the DROI image may be caused by:

(a) the use of an otherwise perfect reference scan that is translated and/or rotated with respect to the sample scan (coordinate shift mismatch),
(b) the use of an imperfect reference with no coordinate shift, or
(c) a combination of (a) and (b), Artifacts caused by coordinate shift mismatch are readily identifiable and affect the DROI at the periphery only. Artifacts caused by an imperfect reference vary in importance but, for small imperfections, are generally tolerable.

Examples of the use of the DROI technique indicate that it is a viable and useful method of CT imaging in a variety of applications including, but not limited to, two-phase flow in pipes, items requiring protective shields and manufactured items such as castings.

Although the invention has been described with reference to preferred embodiments, it should be understood that various other changes and modifications could be made therein by one skilled in the art without varying from the scope and spirit of the invention as defined by the appended claims.

We claim:

1. A method of generating a computed tomographic image of a region of interest of a sample comprising obtaining reference data only for the region-of-interest of a complete reference object that is a relatively good match to the sample outside the region-of-interest and has a known attenuation distribution inside the region-of-interest, scanning only the region-of-interest of the sample to obtain sample data, subtracting the reference data for the region of interest from the sample data to obtain differential data, and reconstructing from the differential data a differential image of the region of interest.

2. A method according to claim 1 wherein the step of obtaining reference data for the region-of-interest of a complete reference object comprises scanning only the region-of-interest of an actual complete reference object.

3. A method according to claim 1 wherein the step of obtaining reference data for the region-of-interest of a complete reference object comprises constructing a digital image of the reference object and mathematically scanning only the region-of-interest of the image to obtain reference data.

4. A method according to claim 3 wherein the attenuating coefficients inside the region-of-interest of the digital image of the reference object are set to zero.

5. A method according to claim 3 wherein the digital image of the reference object is obtained using computer aided design.

6. A method of generating a computed tomographic image showing two phase fluid flow through a sample pipe, comprising obtaining reference data corresponding to a region-of-interest scan of a complete reference pipe through which no fluid is passing, where the region-of-interest is the pipe bore and the reference pipe is a relatively good match to the sample pipe outside the region-of-interest, scanning only the same region of interest of the sample pipe to obtain sample data, subtracting the reference data from the sample data to obtain differential data, and reconstructing from the differential data a differential image of the region-of-interest.

7. A method according to claim 6 wherein the step of obtaining reference data corresponding to a region-of-interest scan of a complete reference pipe through which no fluid is passing comprises scanning an actual pipe through which no fluid is passing.

8. A method according to claim 6 wherein the step of obtaining reference data corresponding to a region-of-interest scan of a complete reference pipe through which no fluid is passing comprises constructing a digital image of the reference pipe through which no fluid is passing and mathematically scanning only the region-of-interest of the image to obtain reference data.

9. A method of generating a computed tomographic image showing a defect in the crotch area of a valve casting, comprising obtaining reference data corresponding to a region-of-interest scan of a complete reference casting that is a relatively good match to the sample casting outside the region-of-interest and has a known attenuation distribution inside the region-of-interest, scanning only the same region-of-interest of the sample valve to obtain sample data, subtracting the reference data from the sample data to obtain differential data, reconstructing from the differential data a differential image of the region-of-interest.

10. A method according to claim 9 wherein the step of obtaining reference data corresponding to a region-of-interest scan of a complete reference casting comprises scanning an actual complete casting.

11. A method according to claim 9 wherein the step of obtaining reference data corresponding to a region-of-interest scan of a complete reference casting comprises constructing a digital image of the casting and mathematically scanning only the region-of-interest of the image to obtain pseudo-scan reference data.

12. A method according to claim 11 wherein the attenuation coefficients inside the region-of-interest of the digital image of the casting are set to zero.

* * * * *